(12) United States Patent
Cheng et al.

(10) Patent No.: US 11,573,446 B2
(45) Date of Patent: Feb. 7, 2023

(54) DISPLAY SUBSTRATE, LIQUID CRYSTAL DISPLAY PANEL, AND DISPLAY DEVICE

(71) Applicants: Hefei BOE Display Technology Co., Ltd., Anhui (CN); BOE Technology Group Co., Ltd., Beijing (CN)

(72) Inventors: Min Cheng, Beijing (CN); Ke Dai, Beijing (CN); Haipeng Yang, Beijing (CN); Maoxiu Zhou, Beijing (CN); Xiaoting Jiang, Beijing (CN); Chunxu Zhang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/530,065

(22) Filed: Nov. 18, 2021

(65) Prior Publication Data

US 2022/0291541 A1  Sep. 15, 2022

(30) Foreign Application Priority Data

Mar. 12, 2021  (CN) .......................... 202110268993.0

(51) Int. Cl.
*G02F 1/1335* (2006.01)
*G02F 1/1333* (2006.01)

(52) U.S. Cl.
CPC .. *G02F 1/133512* (2013.01); *G02F 1/133308* (2013.01)

(58) Field of Classification Search
None
See application file for complete search history.

(56) References Cited

U.S. PATENT DOCUMENTS

| | | | |
|---|---|---|---|
| 2009/0184946 A1* | 7/2009 | Ahn ................ | G02F 1/133512 345/206 |
| 2014/0176884 A1* | 6/2014 | Yang ................ | G02F 1/136209 349/110 |
| 2016/0041436 A1* | 2/2016 | Igeta ................ | G02F 1/133308 349/58 |
| 2016/0077376 A1* | 3/2016 | Lee ................ | G02F 1/133512 349/110 |
| 2020/0057521 A1* | 2/2020 | Lee ................ | G02F 1/1333 |

FOREIGN PATENT DOCUMENTS

CN  110706596 A  * 1/2020 ........... G06F 3/0412

* cited by examiner

*Primary Examiner* — Shan Liu
(74) *Attorney, Agent, or Firm* — IPro, PLLC

(57) ABSTRACT

Disclose are a display substrate, a liquid crystal display panel and a display device. The display substrate is provided with a display region. The display substrate includes: a base substrate, and a black matrix arranged on a side of the base substrate. The black matrix includes: a first region corresponding to the display region, and a plurality of frame regions arranged on a periphery of the first region. At least one rectilinear first slit and at least one rectilinear second slit intersecting with the at least one rectilinear first slit are arranged in the at least one of the frame regions, and an extending direction of the at least one rectilinear first slit is same as an extending direction of the at least one of the frame regions.

10 Claims, 3 Drawing Sheets

DISPLAY SUBSTRATE, LIQUID CRYSTAL DISPLAY PANEL, AND DISPLAY DEVICE

CROSS REFERENCE TO RELATED APPLICATIONS

This application claims the priority of the Chinese patent application No. 202110268993.0 filed to the China National Intellectual Property Administration on Mar. 12, 2021, of which the entire contents are incorporated herein by reference.

FIELD

The present disclosure relates to the field of semiconductors, in particular to a display substrate, a liquid crystal display panel and a display device.

BACKGROUND

In the case of a liquid crystal display panel in the related art, when there is no backlight, an edge of the panel will be whitened; under bright backlight, the edge of the panel will become obviously light transmitting; and under a microscopic condition, light leakage of a black matrix can be clearly seen. In order to achieve an antistatic effect, in a black matrix in the related art, patterning slits are set, but the setting of the patterning slits will cause problems that a transmittance of the display panel is high (the transmittance is about 30%) and is difficult to lower, the antistatic effect is poor, and a process yield is low.

SUMMARY

In a first aspect, embodiments of the present disclosure provide a display panel, having a display region and including: a base substrate; and a black matrix arranged on a side of the base substrate; the black matrix includes a first region corresponding to the display region, and a plurality of frame regions arranged on a periphery of the first region;

at least one rectilinear first slit with an extending direction same as an extending direction of at least one of the frame regions and at least one rectilinear second slit intersecting with the at least one rectilinear first slit are arranged in the at least one of the frame regions.

In a possible implementation, the plurality of frame regions include a first frame region coated by a coating material; and frame regions, other than the first frame region, in the plurality of frame regions each is provided with the at least one rectilinear first slit and the at least one rectilinear second slit.

In a possible implementation, a quantity of the at least one rectilinear first slit is smaller than a quantity of the at least one rectilinear second slit.

In a possible implementation, frame regions, other than the first frame region, in the plurality of frame regions each is provided with one rectilinear first slit; and the one rectilinear first slit penetrate through two opposite edges of the black matrix.

In a possible implementation, frame regions, other than the first frame region, in the plurality of frame regions each is provided with two rectilinear first slits; and each of the two rectilinear first slits penetrate through two opposite edges of the black matrix.

In a possible implementation, an end, facing the first region, of each rectilinear second slit is in contact with a rectilinear first slit, close to the first region, in the two rectilinear first slits.

In a possible implementation, a plurality of pixel openings are arranged in the first region; the quantity of the at least one rectilinear second slit arranged in frame regions, other than the first frame region, in the plurality of frame regions is equal to a quantity of rows of the pixel openings; or the quantity of the at least one rectilinear second slit arranged in frame regions, other than the first frame region, in the plurality of frame regions is equal to a quantity of columns of the pixel openings.

In a possible implementation, the at least one rectilinear first slit of two frame regions connected with each other intersect at a junction region between the two frame regions.

In a possible implementation, a rectilinear first slit, farthest from the first region, in the at least one rectilinear first slit in each of the frame regions is set as a first frame slit, and a spacing between the first frame slit and an edge of the base substrate ranges from 80 µm to 120 µm.

In a possible implementation, in a same frame region, a spacing between two adjacent rectilinear first slits ranges from 80 µm to 120 µm.

In a possible implementation, a width of each of the at least one rectilinear first slit perpendicular to an extending direction of the each rectilinear first slit ranges from 8µm to 12 µm; and a width of each of the at least one rectilinear second slit perpendicular to an extending direction of the each rectilinear second slit ranges from 8µm to 12 µm.

In a second aspect, embodiments of the present disclosure further provide a liquid crystal display panel, including the display substrate provided by the embodiments of the present disclosure.

In a third aspect, embodiments of the present disclosure further provide a display device, including the liquid crystal display panel provided by the embodiments of the present disclosure.

In a possible implementation, a plurality of frame regions include a first frame region; the display device further includes: a coating material, coating the first frame region of a black matrix.

DETAILED DESCRIPTION OF THE EMBODIMENTS

The embodiments of the present disclosure clearer, the technical solutions of the embodiments of the present disclosure will be described clearly and completely in conjunction with the accompanying drawings of the embodiments of the present disclosure. Obviously, the described embodiments are part of the embodiments of the present disclosure, rather than all of the embodiments. Based on the described embodiments of the present disclosure, all other embodiments obtained by those of ordinary skill in the art without creative labor are within the protection scope of the present disclosure.

Unless otherwise defined, the technical terms or scientific terms used in the present disclosure shall have the common meanings understood by those of ordinary skill in the art to which the present disclosure belongs. "First", "second" and similar words used in the present disclosure do not indicate any order, quantity or importance, but are only used to distinguish different components. "Include" or "comprise" and other similar words mean that an element or item appearing before the word covers elements or items listed after the word and their equivalents, but other elements or items are not excluded. Similar words such as "connected" or "linked" are not limited to physical or mechanical connections, and may include electrical connections, whether direct or indirect. "Upper", "lower", "left", "right", etc. are only used to indicate the relative position relationship. When the absolute position of the described object changes, the relative position relationship may also change accordingly.

In order to keep the following description of the embodiments of the present disclosure clear and concise, the present disclosure omits detailed descriptions of known functions and known components.

The embodiments of the present disclosure provide a display substrate, having a display region and including: a base substrate and a black matrix arranged on a side of the base substrate.

Figure 1:
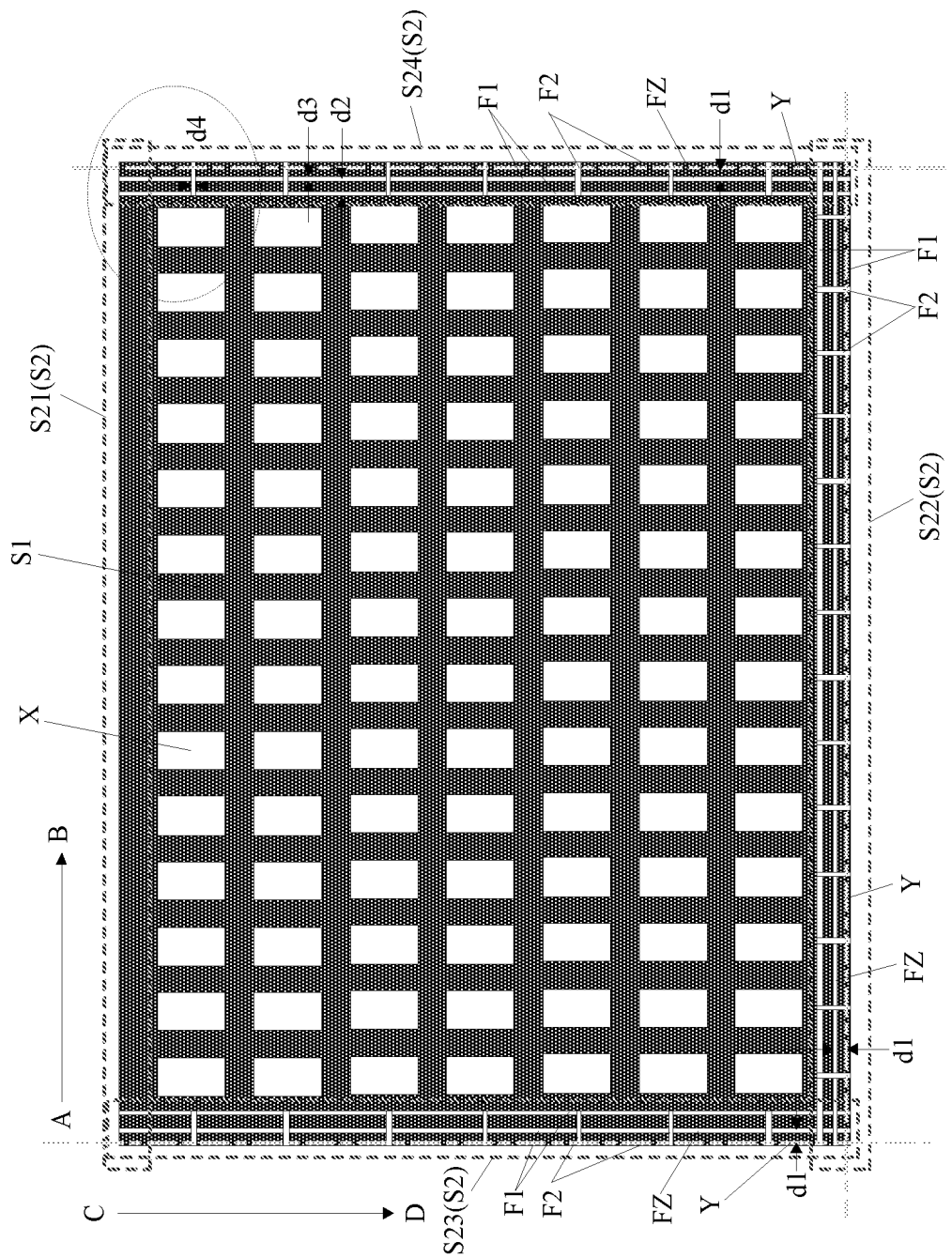
FIG. 1 is schematic structural diagram of a black matrix provided by an embodiment of the present disclosure.

As shown in FIG. 1, the black matrix includes: a first region S1 corresponding to the display region, and a plurality of frame regions S2 arranged on a periphery of the first region S1. In particular, for example, as shown in FIG. 1, the plurality of frame regions S2 may include first frame regions S21 and second frame regions S22 extending in a first direction AB, and third frame regions S23 and fourth frame regions S24 extending in a second direction CD. At least one rectilinear first slit F1 with an extending direction the same as an extending direction of at least one of the frame regions and at least one rectilinear second slit F2 intersecting with the at least one rectilinear first slit F1 are arranged in the at least one of the frame regions S2, and the extending direction of the at least one rectilinear first slit F1 is the same as the extending direction of the at least one of the frame regions. In particular, an extending direction of the at least one rectilinear second slit F2 may be perpendicular to the extending direction of the at least one rectilinear first slit F1.

In the embodiments of the present disclosure, the black matrix includes: the first region S1 corresponding to the display region, and the plurality of frame regions S2 arranged on the periphery of the first region S1. At least one rectilinear first slit F1 and at least one rectilinear second slit F2 intersecting with the at least one rectilinear first slit F1 are arranged in at least one of the frame regions S2, and the extending direction of the at least one rectilinear first slit F1 is the same as the extending direction of the at least one of the frame region. The at least one rectilinear first slit F1 and the at least one rectilinear second slit F2 that intersect vertically and horizontally may achieve a low light transmittance while an antistatic effect is guaranteed. Moreover, when a size of the black matrix is large and a length of the at least one rectilinear first slit is long, the at least one rectilinear second slit intersecting with the at least one rectilinear first slit may avoid the problem that the at least one rectilinear first slit is prone to closing due to influence of particles or exposure during a manufacturing process, resulting in poor antistatic effect and even ineffectiveness.

In specific implementation, since part of the frame regions of the black matrix will be covered by other structures of a display device, for example, the first frame region S21 of the black matrix is coated by a coating material and thus will not be exposed to the outside, no slit is needed in the first frame region. For frame regions, other than the first frame region, exposed to the outside, for example, the second frame regions S22, the third frame regions S23, and the fourth frame regions S24, the at least one rectilinear first slit F1 and the at least one rectilinear second slit F2 may be arranged, as shown in FIG. 1.

In specific implementation, as shown in FIG. 1, the quantity of the at least one rectilinear first slit F1 is smaller than the quantity of the at least one rectilinear second slit F2. In the embodiments of the present disclosure, the quantity of the at least one rectilinear first slit F1 is smaller than the quantity of the at least one rectilinear second slit F2, i.e. the quantity of long slits is smaller than the quantity of short slits. Compared to the arrangement of more long the at least one rectilinear first slit F1, the black matrix may have the low light transmittance while the antistatic effect is achieved.

Figure 2:
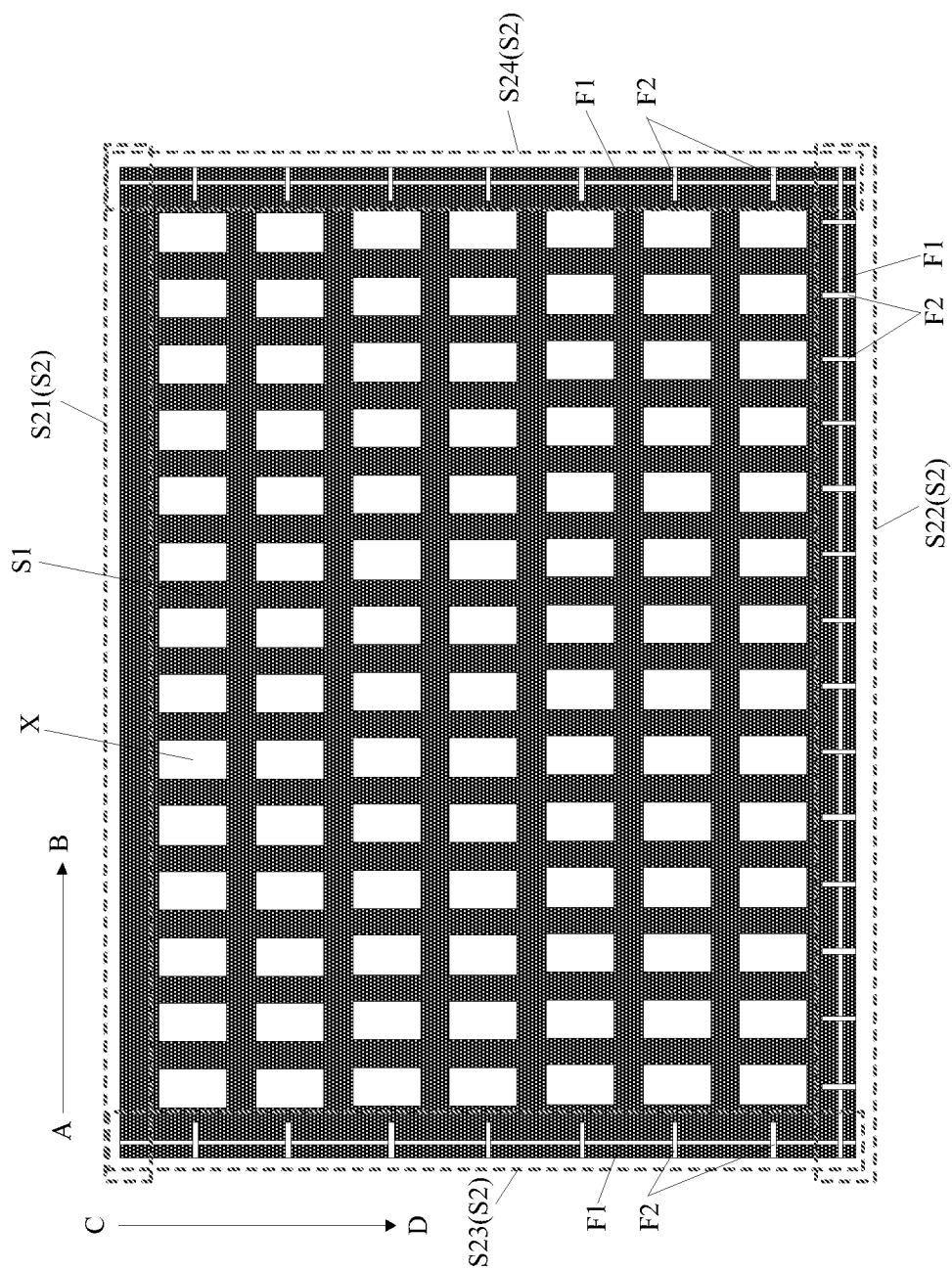
FIG. 2 is a schematic structural diagram of another black matrix provided by an embodiment of the present disclosure.

In a possible implementation, as shown in FIG. 2, one rectilinear first slit F1 is arranged in each of the frame regions, other than the first frame region S21, in the plurality of frame regions; and the one rectilinear first slit F1 penetrate through two opposite edges of the black matrix. In particular, for example, the one rectilinear first slit F1 in each third frame region S23 penetrates through opposite upper and lower edges of the black matrix, i.e. one end of the one rectilinear first slit F1 is in contact with the upper edge of the black matrix and the other end of the one rectilinear first slit F1 is in contact with the lower edge of the black matrix. For another example, the one rectilinear first slit F1 in each second frame region S22 penetrates through opposite left and right edges of the black matrix, i.e. one end of the one rectilinear first slit F1 is in contact with the left edge of the black matrix and the other end of the one rectilinear first slit F1 is in contact with the right edge of the black matrix. In the embodiments of the present disclosure, one rectilinear first slit F1 is arranged in each of the frame regions, other than the first frame region S21, in the plurality of frame regions, so the light transmittance is low while a certain antistatic effect is achieved.

In a possible implementation, as shown in FIG. 1, two rectilinear first slits F1 are arranged in each of the frame regions, other than the first frame region S21, in the plurality of frame regions; and each of the two rectilinear first slits F1 penetrate through two opposite edges of the black matrix. In particular, for example, each of the two rectilinear first slits F1 in each third frame region S23 penetrates through opposite upper and lower edges of the black matrix, i.e. one end of the each of the two rectilinear first slits F1 is in contact with the upper edge of the black matrix and the other end is in contact with the lower edge of the black matrix. For another example, the each of the two rectilinear first slits F1 in each second frame region S22 penetrates through opposite left and right edges of the black matrix, i.e. one end of the each of the two rectilinear first slit F1 is in contact with the left edge of the black matrix and the other end is in contact with the right edge of the black matrix. In the embodiment of the present disclosure, two rectilinear first slits F1 are arranged in each of the frame regions, other than the first frame region S21, in the plurality of frame regions, when an antistatic efficiency reaches a preset demand, the light transmittance is 11.8% (far less than a minimum light transmittance of 29.2% required by the related art to meet the preset demand for antistatic), which greatly reduces the risk of electrostatic breakdown and at the same time, achieves a low light transmittance.

In a possible implementation, as shown in FIG. 1, an end, facing the first region S1, of each rectilinear second slit F2 is in contact with a rectilinear first slit F1, close to the first region S1, in the two rectilinear first slits F1. In particular, for example, in a third frame region S23 in FIG. 1, the rectilinear first slit F1 on a right side is closer to the first frame S1, and an end of each rectilinear second slit F2 facing the first region S1 is in contact with the rectilinear first slit F1 on the right side. In the embodiment of the present disclosure, the end, facing the first region S1, of each rectilinear second slit F2 is in contact with the rectilinear first slit F1, closer to the first region S1, in the two rectilinear first slits F1. Compared with the situation that each rectilinear second slit F2 extends out of a right side of the two rectilinear first slits F1 (taking the third frame region S23 as an example), the black matrix may have a low light transmittance while achieving a same antistatic effect.

In a possible implementation, as shown in FIGS. 1 and 2, a plurality of pixel openings X are arranged in the first region S1. The quantity of the at least one rectilinear second slit F2 arranged in the frame regions, other than the first frame region S21, in the plurality of frame regions is equal to the number of rows of the pixel openings X; or the quantity of the at least one rectilinear second slit F2 arranged in the frame regions, other than the first frame region S21, in the plurality of frame regions is equal to the number of columns of the pixel openings X. In particular, for example, the quantity of the at least one rectilinear second slit F2 arranged in the third frame regions S23 is equal to the number of rows of the pixel openings X; and for another example, the quantity of the at least one rectilinear second slit F2 arranged in the second frame regions S22 is equal to the number of columns of the pixel openings X. In particular, for example, there are 2,160 rows of pixel openings X, and the quantity of the at least one rectilinear second slit F2 arranged in the third frame regions S23 may be set to be 2,160.

In specific implementation, as shown in FIGS. 1 and 2, the at least one rectilinear first slit F1 of two frame regions connected with each other intersect at a junction region between the two frame regions. In particular, for example, the rectilinear first slits F1 in a second frame region S22 and the rectilinear first slits F1 in a fourth frame region S24 intersect at a junction region between the second frame region S22 and the fourth frame region S24.

In a possible implementation, as shown in FIG. 1, a rectilinear first slit F1, farthest from the first region S1, in the at least one rectilinear first slit in each of frame regions S2 is set as a first frame slit FZ, and a spacing d1 between each first frame slit FZ and an edge of the base substrate Y ranges from 80 μm to 120 μm. In particular, for example, the spacing d1 between each first frame slit FZ and the edge of the base substrate Y is 100 μm. In the embodiments of the present disclosure, since the black matrix and the base substrate need to be cut in an integrated mode subsequently, and there is a process error in cutting (specifically, the process error is approximately 100 μm), in order to avoid the situation that the at least one rectilinear first slit F1 are cut off during a cutting process and an antistatic effect cannot be achieved, the spacing between each first frame slit and the edge of the base substrate may be set to range from 80 μm to 120 μm, which may avoid the situation that the rectilinear first slits F1 are cut off due to a cutting error in the cutting process and an effective effect cannot be achieved.

In a possible implementation, as shown in FIG. 1, in a same frame region, a spacing d2 between two adjacent rectilinear first slits F1 ranges from 80 μm to 120 μm. In particular, the spacing d2 between the two adjacent rectilinear first slits F1 may be 100 μm. In particular, for example, a spacing d2 between two adjacent rectilinear first slits F1 in a fourth frame region S24 is 100 μm.

Figure 3:
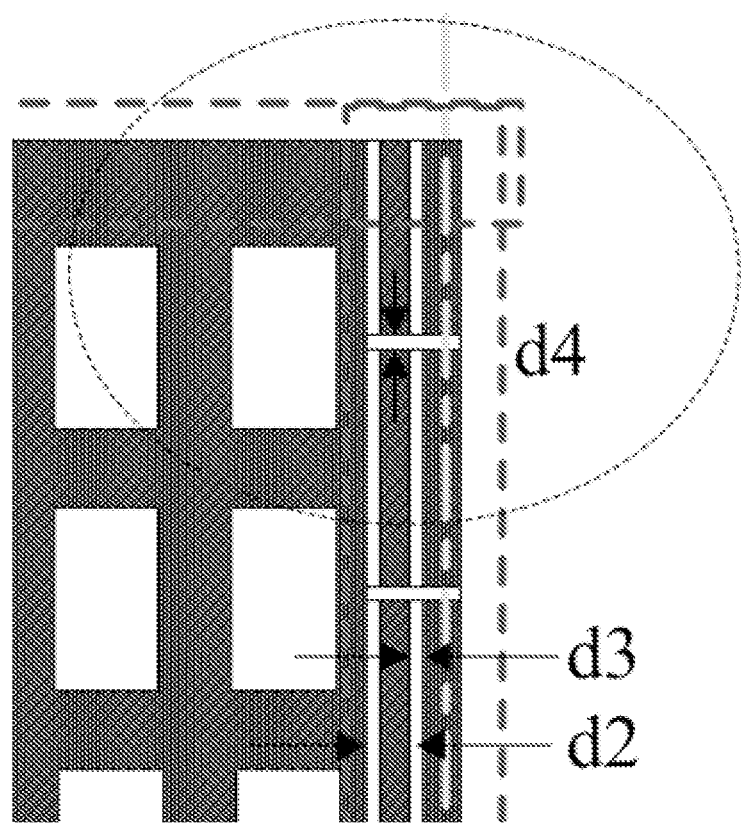
FIG. 3 is an amplified schematic diagram of a dotted line circular position of FIG. 1.

In a possible implementation, as shown in FIGS. 1 and 3, where FIG. 3 is an amplified schematic diagram of a dotted line oval position of FIG. 1, a width d3 of each of the at least one rectilinear first slit F1 perpendicular to the extending direction of the each rectilinear first slit ranges from 8μm to 12 μm; and a width d4 of each of the at least one rectilinear second slit F2 perpendicular to the extending direction of the each rectilinear second slit ranges from 8μm to 12 μm.

In particular, the display substrate provided by the embodiments of the present disclosure may be a color film substrate.

The embodiments of the present disclosure further provide a liquid crystal display panel, including the display substrate provided by the embodiments of the present disclosure.

The embodiments of the present disclosure further provide a display device, including the liquid crystal display panel provided by the embodiments of the present disclosure.

The embodiments of the present disclosure have the beneficial effects as follows: in the embodiments of the present disclosure, the black matrix includes: the first region S1 corresponding to the display region, and the plurality of frame regions S2 arranged on the periphery of the first region S1. At least one rectilinear first slit F1 with the extending direction the same as the extending direction of the at least one of the frame regions and at least one rectilinear second slit F2 intersecting with the at least one rectilinear first slit F1 are arranged in the at least one of the frame regions S2. The at least one rectilinear first slits F1 and the at least one rectilinear second slit F2 that intersect vertically and horizontally may achieve a low light transmittance while an antistatic effect is guaranteed.

Apparently, those of skill in the art can make various changes and modifications to the present disclosure without departing from the spirit and scope of the present disclosure. In this way, if these modifications and variations of the present disclosure fall within the scope of the claims of the present disclosure and equivalent technologies, the present disclosure also intends to include these modifications and variations.

What is claimed is:

1. A display substrate, providing with a display region, and comprising:
   a base substrate; and
   a black matrix arranged on a side of the base substrate;
      wherein the black matrix comprises:
         a first region corresponding to the display region; and
         a plurality of frame regions arranged on a periphery of the first region;
         wherein at least one rectilinear first slit with an extending direction same as an extending direction of at least one of the frame regions and at least one rectilinear second slit intersecting with the at least one rectilinear first slit are arranged in the at least one of the frame regions;
         the plurality of frame regions comprise a first frame region coated by a coating material; and frame regions, other than the first frame region, in the plurality of frame regions each is provided with the at least one rectilinear first slit and the at least one rectilinear second slit;
         a quantity of the at least one rectilinear first slit is smaller than a quantity of the at least one rectilinear second slit;

frame regions, other than the first frame region, in the plurality of frame regions each is provided with one or two rectilinear first slits; and the one or each of the two rectilinear first slits penetrates through two opposite edges of the black matrix.

2. The display substrate according to claim 1, wherein an end, facing the first region, of each rectilinear second slit is in contact with a rectilinear first slit, close to the first region, in the two rectilinear first slits.

3. The display substrate according to claim 1, wherein a plurality of pixel openings are arranged in the first region; and the quantity of the at least one rectilinear second slit arranged in frame regions, other than the first frame region, in the plurality of frame regions is equal to a quantity of rows of the pixel openings; or the quantity of the at least one rectilinear second slit arranged in frame regions, other than the first frame region, in the plurality of frame regions is equal to a quantity of columns of the pixel openings.

4. The display substrate according to claim 3, wherein the at least one rectilinear first slit of two frame regions connected with each other intersect at a junction region between the two frame regions.

5. The display substrate according to claim 1, wherein a rectilinear first slit, farthest from the first region, in the at least one rectilinear first slit in each of the frame regions is set as a first frame slit, and a spacing between the first frame slit and an edge of the base substrate ranges from 80 μm to 120 μm.

6. The display substrate according to claim 5, wherein in a same frame region, a spacing between two adjacent rectilinear first slits ranges from 80 μm to 120 μm.

7. The display substrate according to claim 1, wherein a width of each of the at least one rectilinear first slit perpendicular to an extending direction of the each rectilinear first slit ranges from 8 μm to 12 μm; and a width of each of the at least one rectilinear second slit perpendicular to an extending direction of the each rectilinear second slit ranges from 8 μm to 12 μm.

8. A liquid crystal display panel, comprising the display substrate according to claim 1.

9. A display device, comprising the liquid crystal display panel according to claim 8.

10. The display device according to claim 9, wherein the plurality of frame regions comprise a first frame region; and the display device further comprises: a coating material, coating the first frame region of the black matrix.

* * * * *